United States Patent
Taylor et al.

(10) Patent No.: US 7,646,761 B2
(45) Date of Patent: Jan. 12, 2010

(54) INTEGRATING MULTIMEDIA CAPABILITIES WITH LEGACY NETWORKS

(75) Inventors: Richard C. Taylor, Manotick (CA); Craik R. Pyke, Nepan (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1431 days.

(21) Appl. No.: 10/262,022

(22) Filed: Oct. 1, 2002

(65) Prior Publication Data
US 2004/0062230 A1 Apr. 1, 2004

(51) Int. Cl.
*H04L 12/66* (2006.01)

(52) U.S. Cl. ........................ 370/352; 370/354

(58) Field of Classification Search ........................ None
See application file for complete search history.

(56) References Cited

U.S. PATENT DOCUMENTS

| | | | |
|---|---|---|---|
| 5,454,032 A | 9/1995 | Pinard et al. | 379/167 |
| 5,604,737 A | 2/1997 | Iwami et al. | |
| 5,790,798 A | 8/1998 | Beckett, II et al. | 395/200.54 |
| 5,809,128 A | 9/1998 | McMullin | |
| 5,881,145 A | 3/1999 | Giuhat et al. | |
| 5,884,032 A | 3/1999 | Bateman et al. | |
| 5,912,952 A | 6/1999 | Brendzel | |
| 5,946,386 A | 8/1999 | Rogers et al. | |
| 6,011,843 A | 1/2000 | Hochman et al. | 379/211 |
| 6,058,435 A | 5/2000 | Sassin et al. | |
| 6,061,347 A | 5/2000 | Hollatz et al. | |
| 6,137,869 A | 10/2000 | Voit et al. | |
| 6,196,846 B1 | 3/2001 | Berger et al. | |
| 6,215,865 B1 | 4/2001 | McCalmont | 379/212 |
| 6,289,010 B1 | 9/2001 | Voit et al. | |
| 6,295,293 B1 | 9/2001 | Tonnby et al. | 370/389 |
| 6,320,857 B1 | 11/2001 | Tonnby et al. | |
| 6,404,746 B1 | 6/2002 | Cave et al. | |
| 6,442,268 B1 | 8/2002 | Klaghofer et al. | |
| 6,449,260 B1 | 9/2002 | Sassin et al. | |

(Continued)

FOREIGN PATENT DOCUMENTS

EP 0453128 A2 10/1991

(Continued)

OTHER PUBLICATIONS

Judith R. McGoogan, Joseph E. Merritt, and Yogesh J. Dave, Evolution of Switching Architecture to Support Voice Telephony over ATM, Apr.-Jun. 2000, Bell Labs Technical Journal, vol. 5, Issue 2, pp. 157-168.*

(Continued)

*Primary Examiner*—Jayanti K Patel
*Assistant Examiner*—Anthony Sol
(74) *Attorney, Agent, or Firm*—Withrow & Terranova, P.L.L.C.

(57) ABSTRACT

A communications system that supports multimedia components is easily adapted to existing network elements. Voice components arriving at or coming from a user having multimedia capabilities are referred from a telephony server serving the user to a multimedia server. A determination is made as to whether the other party supports multimedia capabilities. If that determination is negative, the component is passed back to the telephony server with an indication that the session is coming from the multimedia server to avoid an infinite loop. If the determination is positive, a parallel multimedia component is established between the parties while the multimedia server remains aware of the bearer path.

25 Claims, 5 Drawing Sheets

U.S. PATENT DOCUMENTS

| | | |
|---|---|---|
| 6,453,034 B1 | 9/2002 | Donovan et al. |
| 6,459,787 B2 | 10/2002 | McIllwaine et al. .... 379/265.06 |
| 6,512,818 B1 | 1/2003 | Donovan et al. |
| 6,515,996 B1 | 2/2003 | Tonnby et al. |
| 6,539,077 B1 | 3/2003 | Ranalli et al. ............. 379/67.1 |
| 6,584,093 B1 | 6/2003 | Salama et al. |
| 6,594,254 B1 | 7/2003 | Kelly ........................ 370/352 |
| 6,594,357 B1 | 7/2003 | Emerson et al. |
| 6,597,687 B1 | 7/2003 | Rao |
| 6,600,819 B1 | 7/2003 | Catley et al. ............ 379/205.1 |
| 6,614,781 B1 | 9/2003 | Elliott et al. |
| 6,615,236 B2 | 9/2003 | Donovan et al. |
| 6,625,141 B1 * | 9/2003 | Glitho et al. ................ 370/352 |
| 6,690,407 B1 | 2/2004 | Parker et al. |
| 6,697,478 B1 | 2/2004 | Meldrum et al. ....... 379/211.04 |
| 6,724,887 B1 | 4/2004 | Eilbacher et al. |
| 6,747,970 B1 | 6/2004 | Lamb et al. |
| 6,754,693 B1 | 6/2004 | Roberts et al. .............. 709/205 |
| 6,760,429 B1 | 7/2004 | Hung et al. |
| 6,768,722 B1 | 7/2004 | Katseff et al. |
| 6,771,639 B1 | 8/2004 | Holden |
| 6,775,269 B1 | 8/2004 | Kaczmarczyk et al. |
| 6,778,653 B1 | 8/2004 | Kallas et al. |
| 6,822,957 B1 | 11/2004 | Schuster et al. ............. 370/389 |
| 6,831,675 B2 * | 12/2004 | Shachar et al. ........... 348/14.08 |
| 6,865,681 B2 | 3/2005 | Nuutinen |
| 6,870,848 B1 | 3/2005 | Prokop et al. |
| 6,914,897 B1 | 7/2005 | Schuster et al. |
| 6,934,279 B1 | 8/2005 | Sollee et al. |
| 6,937,699 B1 | 8/2005 | Schuster et al. |
| 6,981,022 B2 * | 12/2005 | Boundy ...................... 709/204 |
| 7,110,525 B1 | 9/2006 | Heller et al. |
| 7,123,700 B1 | 10/2006 | Weaver, III et al. |
| 7,139,263 B2 | 11/2006 | Miller et al. |
| 7,184,526 B1 | 2/2007 | Cook |
| 7,197,560 B2 | 3/2007 | Caslin et al. |
| 7,218,722 B1 | 5/2007 | Turner et al. |
| 2002/0075881 A1 * | 6/2002 | Yoakum et al. ............. 370/410 |
| 2002/0118675 A1 | 8/2002 | Strathmeyer et al. |
| 2002/0176404 A1 | 11/2002 | Girard |
| 2003/0063590 A1 * | 4/2003 | Mohan et al. ............... 370/338 |
| 2003/0076815 A1 | 4/2003 | Miller et al. |
| 2003/0126205 A1 | 7/2003 | Lurie |
| 2003/0214958 A1 * | 11/2003 | Madour et al. ............. 370/401 |
| 2004/0001501 A1 | 1/2004 | Delveaux et al. |
| 2007/0110043 A1 | 5/2007 | Girard |

FOREIGN PATENT DOCUMENTS

| | | |
|---|---|---|
| EP | 0721266 A2 | 7/1996 |
| EP | 0999712 A2 | 5/2000 |
| EP | 1091548 A2 | 4/2001 |
| EP | 1148688 A1 | 10/2001 |
| WO | 98/44703 A1 | 10/1998 |
| WO | WO 01/15423 A1 | 3/2001 |
| WO | 01/69883 A2 | 9/2001 |
| WO | 02/11411 A1 | 2/2002 |

OTHER PUBLICATIONS

International Search Report and Written Opinion for PCT/IB02/04939 mailed Mar. 18, 2003.

Thom, Gary A., "H.323: The Multimedia Communications Standard for Local Area Networks," IEEE Communications Magazine, vol. 34, No. 12, Dec. 1996, pp. 52-56, XP 000636454.

International Search Report and Written Opinion for PCT/IB03/04263 mailed Feb. 16, 2004.

International Search Report and Written Opinion for PCT/IB03/04269 mailed Feb. 3, 2004.

Byte.com, http://www.byte.com/art/9801/sec5/art24.htm.

Anonymous: "H.245: Control Protocol for Multimedia Communication," Paragraph 5.2, May, 1999, http://www.ihserc.com.

PCT International Search Report for PCT/IB03/04276, mailed on Jan. 21, 2004.

* cited by examiner

INTEGRATING MULTIMEDIA CAPABILITIES WITH LEGACY NETWORKS

FIELD OF THE INVENTION

The present invention relates to multimedia communications, and, in particular, relates to a particular technique for handling multimedia calls with clients having legacy phones and services.

BACKGROUND OF THE INVENTION

The world of telecommunications is evolving at a rapid pace. Consumers are perceived to demand new features, especially in the area of multimedia services. Sharing files, video conferencing, sharing a virtual white board, and similar activities are helpful in the business context as geographically dispersed personnel try to coordinate efforts on projects. While the business world may be the driving force behind the need for such multimedia services, the residential consumer may also desire to take advantage of these services.

A few approaches have been proposed to provide integrated multimedia services. The first approach is to replace the customer premises equipment and network equipment with equipment that supports this functionality seamlessly. This approach is less than optimal for a number of reasons. First, it forces a large cost on the network providers and the consumers who have to replace costly, functioning equipment that, in many cases, is still well within its nominal life expectancy. Second, the older equipment has evolved over time until approximately three hundred different services are offered on this legacy equipment. After transitioning to the newer equipment, there will be a lag between deployment and reintegration of these services as new software must be written to implement the services on the new equipment. Many consumers of these services would not be happy with the loss of these services in the interim. Other drawbacks such as determining a standard or protocol and retraining users in the new hardware and software are also present.

A second approach has been proposed by the assignee of the present invention and embodied in U.S. patent application Ser. No. 09/960,554, filed Sep. 21, 2001, which is hereby incorporated by reference in its entirety. That application provides a way to integrate multimedia capabilities with circuit switched calls. In the circuit based domain, this solution is functional. However, there remains a need for integrating multimedia capabilities in packet switched calls while preserving presently deployed network hardware.

SUMMARY OF THE INVENTION

The present invention provides a solution in the packet domain for integrating voice calls with multimedia sessions as a blended call. A blended call is a call which blends voice and multimedia functions into a single communication session. In an exemplary embodiment, a multimedia server is associated with a telephony server. The multimedia server has software incorporated therein that manages blended calls, using the functions of the multimedia server where appropriate and the telephony server where appropriate. To the multimedia server, there is a single session, but the session may have a voice component and a multimedia component. This software is sometimes referred to herein as a blender. In an alternate embodiment, the blender may be a function of sequential logic devices or other hardware that performs the same functions.

Specifically, the present invention takes an incoming call from a remote caller that is received at a telephony server and accesses a database to determine if the intended recipient of the phone call has blended capabilities. If the answer is negative, the call is handled according to conventional protocols. If the answer is affirmative, the intended recipient supports blended calling, then the telephony server directs the call to a multimedia server, and particularly to a multimedia server with blender software associated therewith. The blender software receives the call request and initiates a single session with two call components: 1) a voice call component and 2) a multimedia call component. The voice call component is handled through the telephony server, and the multimedia call component is handled through the multimedia server. As used herein, the multimedia component includes all the non-voice parts of the call. As part of the two call components, two signaling paths are routed to the blender software, which may integrate the signaling paths into a single signal path as part of the single session, which is used by the multimedia server to control the bearer paths associated with the call. Further, when passing the voice call component back to the telephony server, the blender may include an indication that the component is being passed from the blender and that the telephony server is not to redirect or "loop" the signal back to avoid infinite loops between the blender and the telephony server. The indication to prevent the redirection or looping back may be a "loopback signal" such as a flag, information in a header, or other signaling technique. Additionally, the indication may not be a signal per se, but could be a persistent attribute such as call delivery via a specific trunk on the telephony server reserved for signals that have been processed by the blender. As used herein, the terms "loopback signal" and "loopback indication" cover such signals and indications. It should be appreciated that a loopback signal falls within the definition of a loopback indication as used herein.

An outgoing call from a user that has blended capabilities may be processed at the telephony server and a destination address extracted to verify that the user is making a call. The telephony server, upon reference to a database to determine that the caller in this instance has blended capabilities, refers the call to a blender function on the multimedia server. The blender then initiates two call components: 1) a voice call component and 2) a multimedia call component. The multimedia server may handle both components as a single session, or may redirect or loop the voice call component back to the telephony server with an indication that the voice call component has been redirected back from blender processing. As noted above, the indication may be a loopback signal or loopback indication.

While many systems may be used, the present invention is well suited for use with a Session Initiation Protocol for Telephones (SIP-T) configuration as the information included in the SIP-T messages contains the information helpful in setting up and tearing down the parallel call components.

In another aspect of the present invention, an Intelligent Network (IN) signal may be used to determine if a blended call is being handled. If the call is a blended call, then the call is referred to the blender. If the call is not blended, the telephony server handles the call as normal. This embodiment effectively integrates the circuit based system described in the previously incorporated '554 application with the packet based approach of the present invention.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is designed to prolong the viability of existing network devices by allowing existing customer premises equipment and existing network elements to be used to support multimedia capabilities. As used herein, a blended call is a call that supports voice and multimedia exchanges of information. To create the blended call, a telephony server or a multimedia server sends calls to blender software. The blender software initiates parallel voice and multimedia components with the customer premises equipment. The voice session may pass through the telephony server with an indication that blended processing has occurred. The blender further keeps control of the signaling paths of the parallel components so that the bearer path may be controlled to accommodate multimedia requests at any stage during the call.

Because of the desire to be backwards compatible, the present invention may be used on any number of network systems using a number of different protocols. An exhaustive list of suitable networks and protocols is beyond the scope of the present discussion, but those of ordinary skill in the art will appreciate variations on the subject matter herein disclosed after a review of an exemplary embodiment, which is based on a session initiation protocol (SIP) environment.

Figure 1:
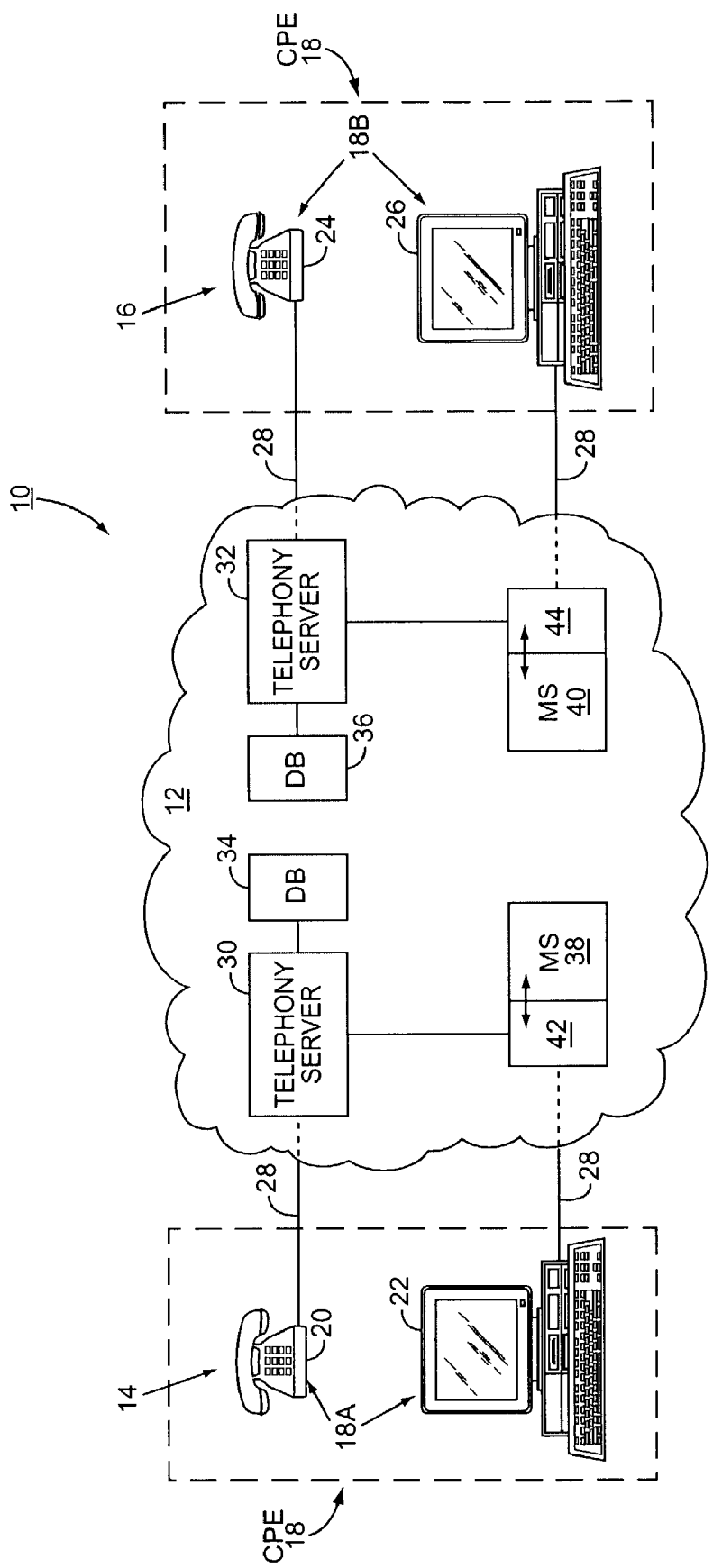
FIG. 1 illustrates a communication environment according to one embodiment of the present invention.

A communication environment 10 capable of carrying out the concepts of the present invention is illustrated in FIG. 1. The communication environment 10 depicted includes a communication network 12, which may preferably include a packet switched network with SIP enabled devices. Thus, the network may include any type of packet switched network having devices using SIP to facilitate communications between two or more devices, also referred to herein as a SIP enabled network.

Two clients 14, 16 are connected to the communication network 12. Each client 14, 16 may have customer premises equipment (CPE) 18 associated therewith, denoted 18A for client 14 and 18B for client 16. Specifically, client 14 may have a telephone type device 20 and a computer type device 22. Client 16 may have a telephone type device 24 and a computer type device 26.

In general, the telephone type devices 20, 24 are directed to voice communications with limited data options such as displaying a number called, a calling number, time elapsed and other common telephony functions. In contrast, the computer type devices 22, 26 may have a monitor, a keyboard, user input devices, and other conventional computer features such that a user may provide inputs and receive outputs and particularly generate and view multimedia content on the computer type device 22, 26. It is possible that a telephone type device 20, 24 could be integrated with its corresponding computer type device 22, 26 into a single piece of customer premises equipment 18 with the functionalities of both devices.

Telephone type devices 20, 24 and computer type devices 22, 26 may contain data processing devices such as microprocessors which implement software that may be stored on any appropriate computer readable medium such as memory, floppy disks, and compact discs. Alternatively, the functionality of the present invention may be stored in sequential logic as is well understood. The telephone type devices 20, 24 may, if desired, be "dumb" SIP terminals, H.323 terminals, or other devices delivering primarily voice based service. Each piece of customer premises equipment 18 may be a user agent within the SIP enabled network. As the telephone type devices 20, 24 and the computer type devices 22, 26 do not have a full range of features, they may be referred to as feature limited user agents.

Clients 14, 16 are connected to the communication network 12 by one or more connections 28. These connections 28 may be wireless or wirebased. In the event that they are wirebased, copper line, fiber optic line, or other comparable communication medium may be used. It is preferred that the connection 28 be a wideband connection, suitable for exchanging large amounts of information quickly. Note further that while multiple connections are shown, a single connection may in fact provide all the communication links to the customer premises equipment 18.

At some point in the communication network 12, the connection 28 from the telephone type device 20, 24 terminates on a telephony server, such as telephony servers 30, 32. The telephony servers 30, 32 may be the CS2000 or DMS100 sold by Nortel Networks Limited of 2351 Boulevard Alfred-Nobel, St. Laurent, Quebec, Canada, H4S 2A9. Other class five telecommunication switches or comparable devices including a PBX or a KEY system could also be used as needed or desired and may support both circuit switched voice calls and voice over packet calls. The telephony servers 30, 32 may communicate with one another and other components in the communication network 12 via a Session Initiation Protocol for Telephones (SIP-T). SIP-T is fully compatible with other SIP enabled devices. Still other communication protocols could be used if needed or desired.

Each telephony server 30, 32 may be connected to or integrated with a database (DB) server 34, 36. The database servers 34, 36 may track which clients support which services. For example, a client 14 may support blended services, call forwarding, and the like, each of which is noted in the database server 34. The database server 34 may index the entries by a trunk line, a directory number, or other unique identifier as is well understood.

Other components of the present invention are multimedia servers (MS) 38, 40 which may be positioned throughout the communication network 12 as needed to provide the appropriate quality of service for the present invention. Multimedia servers 38, 40 are sometimes referred to in the industry as media portals and may be the Interactive Multimedia Server (IMS) sold by Nortel Networks Limited. The IMS is based on JAVA technology and is a SIP enabled device capable of serving SIP clients by providing call conferencing, call transfers, call handling, web access, whiteboarding, video, unified messaging, distributed call centers with integrated web access and other multimedia services. Other media portals or multimedia servers may also be used if needed or desired.

Operating off of the data processing devices of the multimedia servers 38, 40 is software that embodies blenders 42, 44 respectively. An exemplary blender 42, 44 is further explicated in commonly owned U.S. patent application Ser. No. 10/028,510, filed 20 Dec. 2001, which is hereby incorporated by reference in its entirety. The '510 application refers to the blender as a combined user agent. The present invention builds on the functionality described in the '510 application by showing how the telephony server and the multimedia server interact in response to commands from the blender. As an alternative to software, the blenders 42, 44 may be instructions embedded in sequential logic or other hardware as is well understood.

The present invention takes incoming and outgoing calls associated with a client, such as client 14, and routes the call to the blender 42 associated with the telephony server 30. The routing to the blender 42 may be done by standard telephony interfaces such as an ISUP trunk, a Primary Rate Interface (PRI) link, a Public Telephone Service (PTS) trunk, or more preferably a SIP or SIP-T connection. The blender 42 then initiates two parallel components for the call. The first component is a voice component and the second component is a multimedia component. Each component may be established with the corresponding piece of customer premises equipment 18A, and the signaling paths pass through and are controlled by the blender 42. A more detailed exploration of this is presented below.

It should be appreciated that the various components within the communication network 12 may communicate with one another even though specific connections are not illustrated. This reflects that in a packet network, the connections are frequently virtual and may change over time or between packets depending on load, router availability, and similar network traffic conditions. Further, the SIP enabled network may have gateways to the Public Switched Telephone Network (PSTN), the Public Land Mobile Network (PLMN), and the like. As the particular network and protocol are not central to the present invention, a further discussion of these well known elements is foregone. Also, the particular connections to the client 14 may be varied. For example, a single Digital Subscriber Line (DSL) into a location may serve both the telephone type device 20 and the computer type device 22. Alternatively, the telephone type device 20 may be served by a phone line and the computer type device 22 served by a cable modem or the like as is well understood.

Before turning to the details of the present invention, an overview of SIP may be helpful, as the following discussion is couched in terms of the commands used by SIP. The specification for SIP is provided in the Internet Engineering Task Force's Request for Comments (RFC) 3261: Session Initiation Protocol Internet Draft, which is hereby incorporated by reference in its entirety. A SIP endpoint is generally capable of running an application, which is generally referred to as a user agent (UA), and is capable of facilitating media sessions using SIP. User agents register their ability to establish sessions with a SIP proxy by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network by providing the Internet Protocol (IP) address and port that the user agent will use for SIP sessions.

A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages.

When a user agent wants to establish a session with another user agent, the user agent initiating the session will send an "INVITE" message to the SIP proxy and specify the targeted user agent in the "TO:" header of the INVITE message. Identification of the user agent takes the form of a SIP URL. In its simplest form, the URL is represented by a number of "<username>@<domain>", such as "janedoe@nortelnetworks.com." The SIP proxy will use the SIP URL in the TO: header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a "200 OK" message, and a session between the respective user agents will be established as per the message exchange required in the SIP specification. Media capabilities are passed between the two user agents of the respective endpoints as parameters embedded within the session setup messages, such as the INVITE, 200 OK, and acknowledgment (ACK) messages. The media capabilities are typically described using the Session Description Protocol (SDP). Once respective endpoints are in an active session with each other and have determined each other's capabilities, the specified media content may be exchanged during an appropriate media session.

Figure 2:
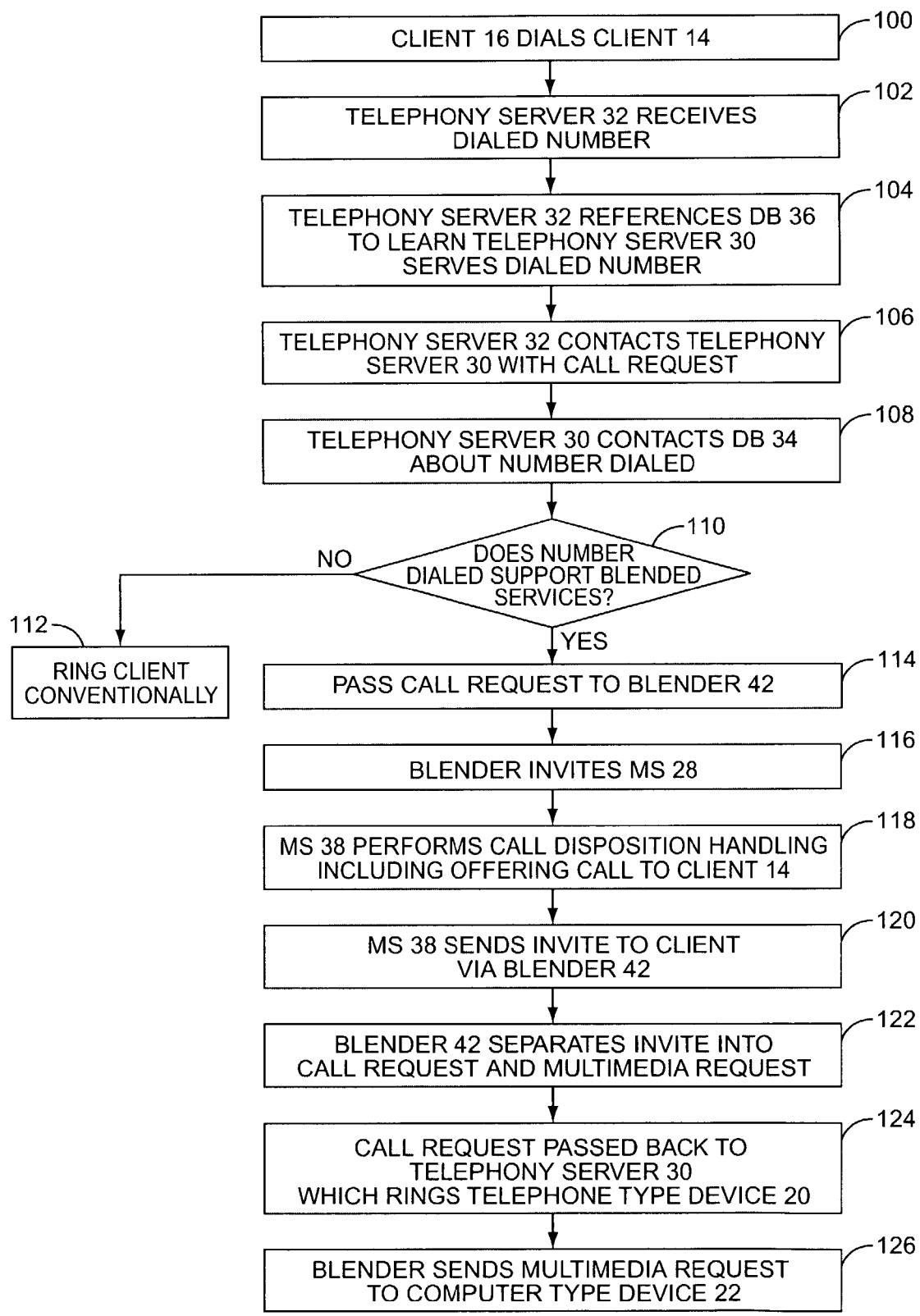
FIG. 2 illustrates the methodology of an exemplary embodiment of an incoming voice call used in the present invention.

Against this protocol backdrop, FIG. 2 illustrates a flow chart of the methodology of an incoming call to a blended client 14. In particular, a client 16 dials a number for the client 14 on the telephone type device 24 (block 100). The telephony server 32 receives the dialed number (block 102) as is conventional. The telephony server 32 references the database server 36 to learn that telephony server 30 serves the dialed number (block 104). The telephony server 32 contacts the telephony server 30 with the call request (block 106). So far, the call processing is performed according to any conventional protocol and over any conventional network hardware.

When the telephony server 30 receives the call request, the telephony server 30 references the database server 34 about the number dialed (block 108) to determine if the number dialed supports blended services (block 110). If the answer to block 110 is "no", blended services are not supported, the telephony server 30 rings the client 14 conventionally (block 112).

If, however, the answer to block 110 is "yes", the dialed number does support blended services, then the telephony server 30 passes the call request to the blender 42 in the multimedia server 38 (block 114). The blender 42 issues an INVITE message (hereinafter "invite") to the multimedia server 38 (block 116). The multimedia server 38 performs call disposition handling including offering the call to client 14 (block 118). Call disposition handling may include for example a "find-me, follow-me" function, call blocking, routing to voice mail based on call screening criteria, updating a user's presence-state information, and the like.

The multimedia server 38 sends an "invite" to the client 14 via the blender 42 (block 120). The blender 42 separates the "invite" into a call request and a multimedia request (block 122). The requests may be INVITE messages according to the SIP standard. The blender 42 sends the call request back to the telephony server 30 which rings the telephone type device 20 (block 124). The blender 42 may, as part of sending the call request back to the telephony server 30, include indicia or otherwise provide an indication that designates that the call request is coming from the blender such that the telephony server 30 does not redirect or otherwise loop the call request back to the blender 42 as would be normal for an incoming call. These indicia may take any appropriate form such as a flag, information in the header, a persistent condition, or other technique, and prevent an infinite loop from forming between the telephony server 30 and the blender 42.

The blender 42 sends the multimedia request to the computer type device 22 (block 126). The multimedia server 38 maintains control over the signaling paths associated with the blended session. In an exemplary embodiment, the blender 42 merges the signaling paths of the voice component and the multimedia component into a single signaling path and passes the merged signaling path to the multimedia server 38 as a single session. By having access to the signaling path of the session, the multimedia server 38 may control the bearer paths of the components without having to parse the information in the bearer path.

Note that because SIP is being used, the multimedia server 38 has access to the Uniform Resource Locators (URLs) of the endpoints of the call (the respective clients 14, 16), the capabilities of the clients 14, 16, and other information relevant to the call disposition handling. Other protocols may provide the same information, but SIP is particularly well suited for this task.

Figure 3:
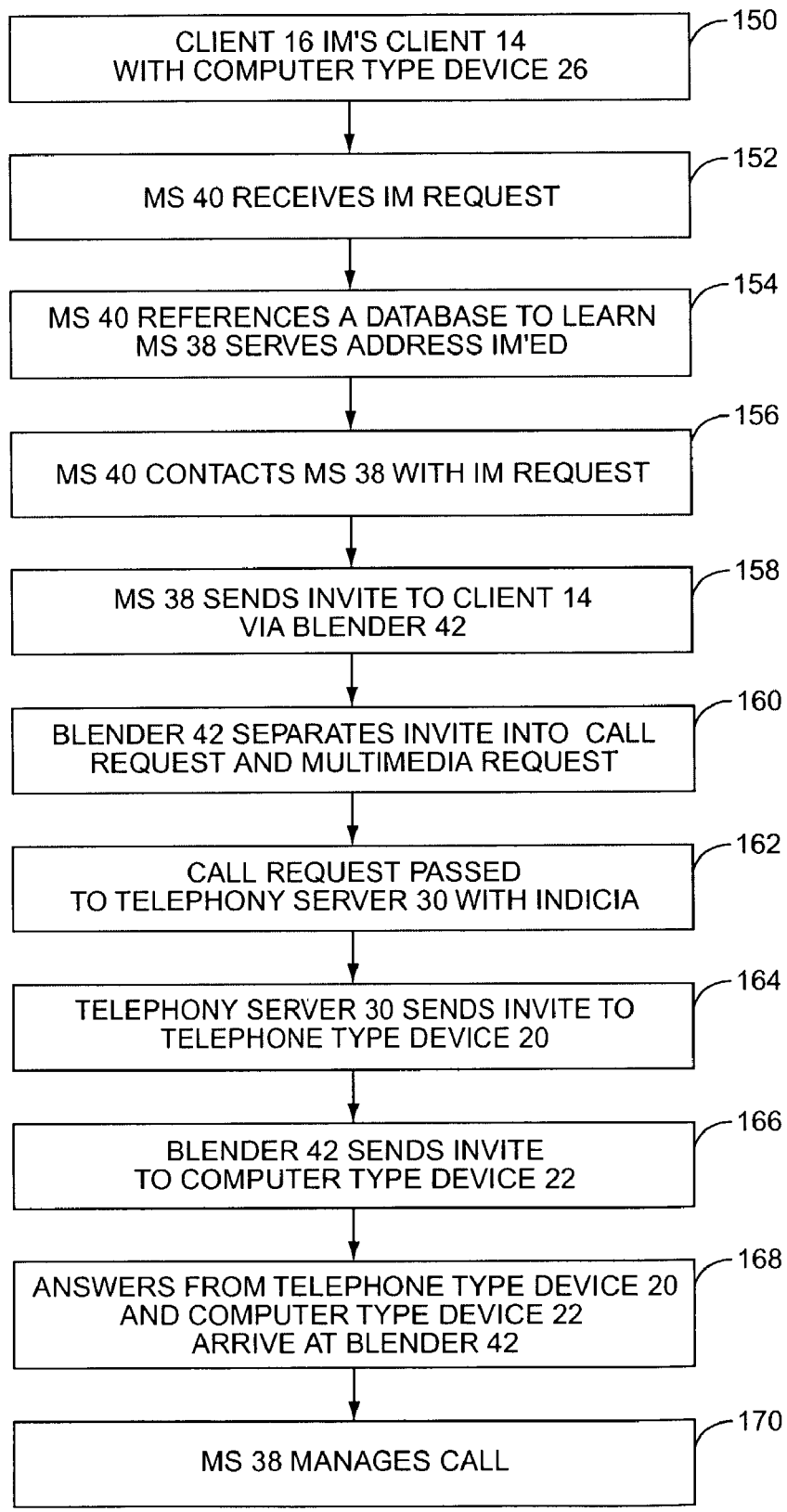
FIG. 3 illustrates the methodology of an exemplary embodiment of an incoming multimedia call used in the present invention.

FIG. 3 illustrates an incoming multimedia call methodology. The client 16 desires to instant message (IM) the client 14. To achieve this, the client 16 IM's the client 14 with computer type device 26 (block 150). The IM request may include an address for the client 14, an indication that the client 16 supports blended capabilities and other SIP information. The multimedia server 40 receives the IM request (block 152) and references a database (not shown explicitly) to learn that multimedia server 38 serves the address (block 154).

The multimedia server 40 contacts the multimedia server 38 with the IM request (block 156). The multimedia server 38 sends an "invite" to client 14 via the blender 42 (block 158). The blender 42 separates the "invite" into a call request and a multimedia request (block 160). The call request is passed to the telephony server 30 with indicia that the call request is coming from the blender 42 (block 162) to prevent the creation of an infinite loop. The telephony server 30 sends an "invite" to the telephone type device 20 (block 164). At this point the telephone type device 20 may not ring, but it may answer the "invite" to set up the signaling path associated with the provision of call services. The blender 42 also sends an "invite" to the computer type device 22 (block 166). The answers from the telephone type device 20 and the computer type device 22 arrive at the blender 42 (block 168), which merges them into a single signaling path and delivers the signaling path to the multimedia server 38. The multimedia server 38 then manages the call (block 170) by maintaining control over the signaling path and allowing the bearer path to be routed through the communication network 12 as needed. If at any point one of the clients 14, 16 wishes to establish a voice connection, the signaling path for the voice session is already in existence through the blender 42 and may be activated. Alternatively, the invitation for the voice component may only be generated upon request by the users. Thus, the IM session may continue as normal until a user decides to speak with the other party. Upon issuing the appropriate command to the computer type device 22, the blender 42 receives the request to activate the voice component.

Figure 4:
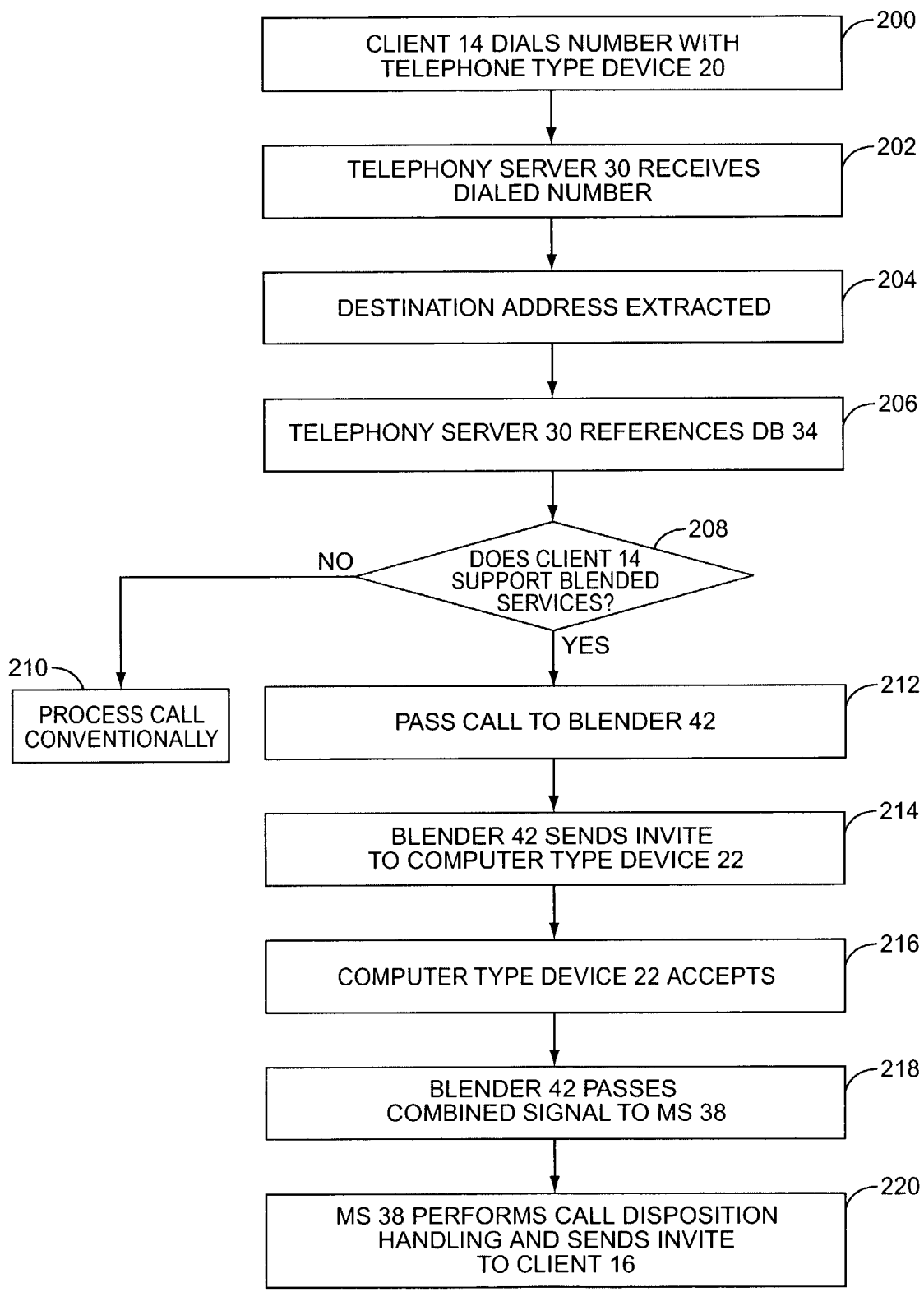
FIG. 4 illustrates the methodology of an exemplary embodiment of an outgoing voice call used in the present invention.

FIG. 4 illustrates the methodology of an outgoing voice call from a client 14. The client 14 dials a number with the telephone type device 20 (block 200). The telephony server 30 receives the dialed number (block 202). The destination address is extracted by the telephony server 30 (block 204) to determine that the client 14 is actually making a call rather than activating a call handling feature such as call forwarding, programming a speed call number, or similar features. The call can be a speed call activation, a normally dialed number, or other technique such that an indication is made that there is a call and not a call handling feature. The telephony server 30 references the database 34 (block 206) and determines if the client 14 supports blended services (block 208).

If the answer to block 208 is "no", the client 14 does not support blended services, the call is processed conventionally (block 210). If however, the answer to block 208 is "yes", the client 14 does support blended services, the telephony server 30 passes the call to the blender 42 (block 212). The blender 42 sends an "invite" to the computer type device 22 (block 214). The computer type device 22 accepts (block 216). Note that a bearer path may not exist yet to the computer type device 22, but the signaling path associated with the provision of the multimedia session may be created such that if the client 14 desires to begin using multimedia services, they are readily available. The blender 42 passes the combined signal to the multimedia server 38 (block 218). The multimedia server 38 performs call disposition handling and sends an "invite" to client 16 (block 220). The multimedia server 38 may route the voice portion of the call back through the telephony server 30 if needed or desired, or may handle that portion itself. Other arrangements could also be made. Note also that the invitation to the computer type device 22 may not be issued until a function is invoked that necessitates the provision of multimedia services.

Figure 5:
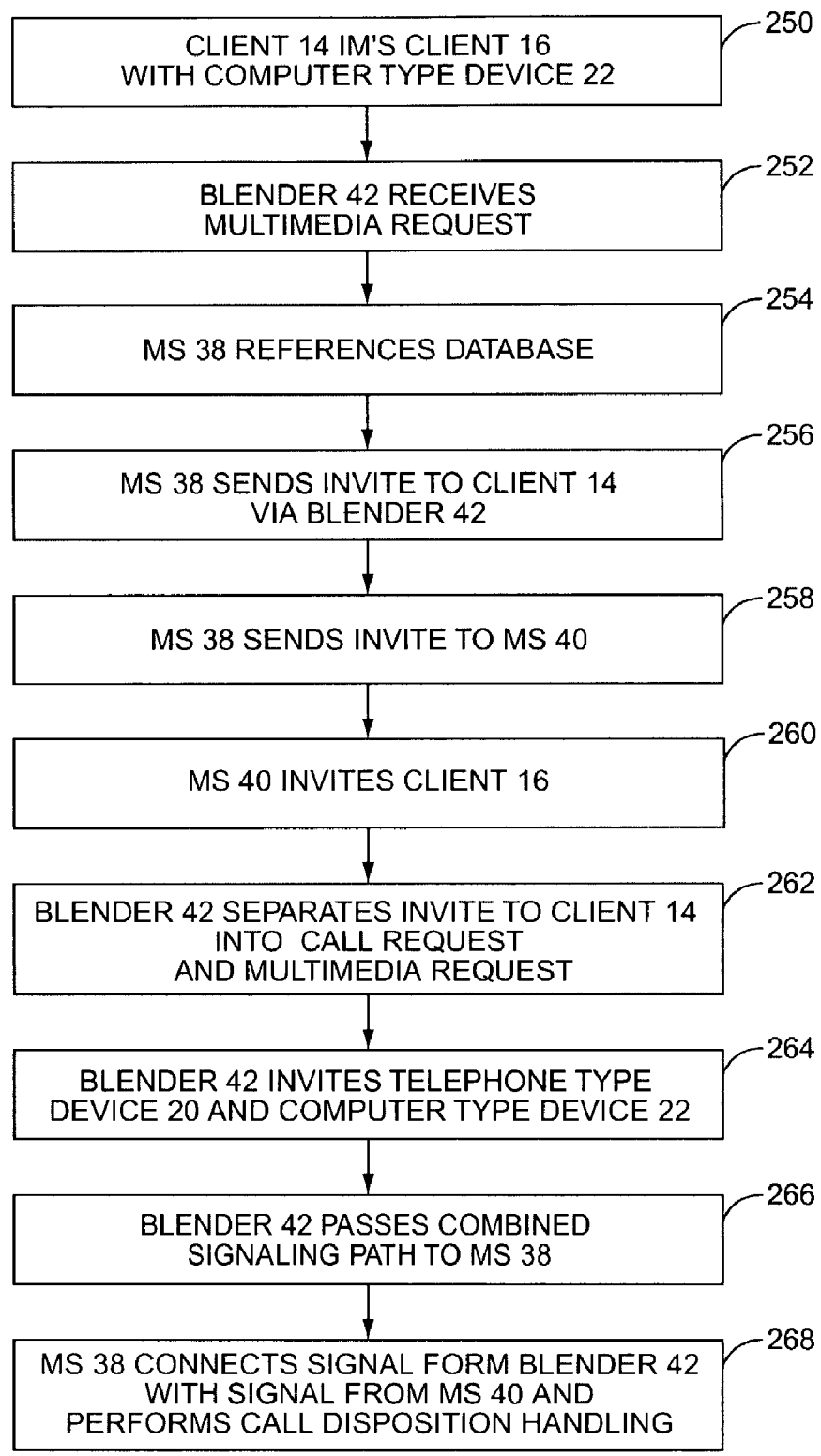
FIG. 5 illustrates the methodology of an exemplary embodiment of an outgoing multimedia call used in the present invention.

FIG. 5 illustrates an exemplary method of an outgoing multimedia call from the client 14. The client 14 desires to instant message the client 16 and sends an IM to client 16 with the computer type device 22 (block 250). The multimedia server 38 receives the multimedia request (block 252). The multimedia server 38 may reference a database (not shown explicitly) to determine which multimedia server serves the destination address of the IM request (block 254). The multimedia server 38 sends an invitation to the client 14 via the blender 42 (block 256).

Concurrently with the invitation to the client 14, the multimedia server 38 sends an "invite" to the multimedia server 40 (block 258). The multimedia server 40 then invites the client 16 to join the call (block 260). The blender 42 is meanwhile separating the "invite" to the client 14 into a call request and a multimedia request (block 262). The blender 42 invites the telephone type device 20 and the computer type device 22 (block 264) to join the call. Note that the original request from the computer type device 22 may cause the multimedia request to subsume into the original request. Further, the "invite" to the telephone type device 20 may be routed through the telephony server 30 and have a loopback signal or a loopback indication that prevents the formation of an infinite loop between the telephony server 30 and the blender 42.

The blender 42 passes the combined signaling path from the telephone type device 20 and the computer type device 22 to the multimedia server 38 (block 266) and the multimedia server 38 connects the signal from the blender 42 with the signal from the multimedia server 40 and performs call disposition handling (block 268). Again, it is possible that the telephony server 30 may not pass the invitation to the telephone type device 20 until that function is invoked by the participants.

As another embodiment, instead of relying on SIP for all of the trigger commands, the present invention may be integrated with an Intelligent Network (IN) such that for basic call disposition handling, the IN triggers and commands are used. For mid-call activation of multimedia features, the fact that the multimedia server 38 has access to the signaling path allows the multimedia server 38 to provide the requested multimedia services. For more information on the use of the IN as a trigger point, see the previously incorporated '554 application.

Note that while the processes above have been described in a generally linear fashion, it is within the scope of the present invention to rearrange the order of some of the steps such that they occur concurrently or in different orders where needed or desired.

Those skilled in the art will recognize improvements and modifications to the preferred embodiments of the present invention. All such improvements and modifications are considered within the scope of the concepts disclosed herein and the claims that follow.

What is claimed is:

1. A multimedia server comprising:
   a server associated with a telephony server in a packet network and adapted to:
      receive a request for a voice component for a target user from the telephony server;
      send an invite to the target user via blender software associated with the server;
      create a multimedia component in parallel with the voice component for the target user;
      pass the voice component through the telephony server;
      pass the voice component back to the telephony server along with a loopback indication that causes the telephony server to not send the voice component back to the multimedia server;
      send the multimedia component to a computing device associated with the target user via the blender software; and
      maintain association with signaling paths of both the voice component and the multimedia component such that multimedia services may be provided during the course of the voice component.

2. The multimedia server of claim 1 wherein said voice component is selected from a group consisting of: incoming and outgoing.

3. The multimedia server of claim 1 wherein said server communicates with the computing device of the target user.

4. The multimedia server of claim 1 wherein said server communicates with the telephony server via Session Initiation Protocol.

5. A telephony server in a packet network comprising:
   a server associated wit a multimedia server and adapted to:
      receive a call request having a dialed number;
      reference a database server to determine if the dialed number supports blended services;
      pass a voice component of the call request to the multimedia server for management of parallel voice and multimedia components;
      receive the voice component back from the multimedia server; and
      evaluate whether a component arriving at said server is a new component, a component arriving from the multimedia server, or a component passed back from the multimedia server.

6. The telephony server of claim 5 wherein said server communicates with the multimedia server via Session Initiation Protocol.

7. The telephony server of claim 5 wherein said voice component is selected from a group consisting of: incoming and outgoing.

8. A method of communicating comprising:
   receiving, at a multimedia server, a voice component for a target user from a telephony server in a packet network;
   sending an invite to the target user via blender software associated with the multimedia server;
   creating a multimedia component in parallel with the voice component for the target user;
   passing the voice component back through the telephony server;
   indicating to the telephony server that said passing comes from the multimedia server to alert the telephony server not to send the voice component back to the multimedia server;
   sending the multimedia component to a computing device associated with the target user via the blender software; and
   maintaining association at the multimedia server with a signaling path associated with the voice component and the multimedia component such that multimedia services may be provided during the course of the voice component.

9. The method of claim 8 wherein receiving, at the multimedia server, the voice component comprises receiving the voice component selected from a group consisting of: incoming and outgoing.

10. The method of claim 8 wherein said creating occurs in the blender software associated with the multimedia server.

11. The method of claim 8 further comprising communicating from the multimedia server to the telephony server using Session Initiation Protocol.

12. A method of communicating comprising:
   associating a telephony server in a packet network with a multimedia server;
   receiving a call request having a dialed number;
   referencing a database server to determine if the dialed number supports blended services;
   passing a voice component of the call request to the multimedia server;
   receiving the voice component back from the multimedia server with a loopback indication; and
   evaluating whether a component arriving at said telephony server is a new component, a component from the multimedia server, or a component passed back from the multimedia server based on the loopback indication.

13. The method of claim 12 further comprising communicating between the telephony server and the multimedia server via Session Initiation Protocol.

14. The method of claim 12 wherein passing the voice component comprises passing the voice component selected from a group consisting of: incoming and outgoing.

15. The method of claim 12 wherein said voice component is generated initially at said telephony server.

16. The method of claim 12 wherein said voice component is generated initially at a blender associated with the multimedia server.

17. A method of communicating comprising:
receiving, at a multimedia server, a multimedia component for a target user;
sending an invite to the target user via blender software associated with the multimedia server;
creating a voice component in parallel with the multimedia component for the target user;
passing the voice component to a telephony server with an indication of origin from the multimedia server to alert the telephony server not to send the voice component back to the multimedia server;
sending the multimedia component to a computing device associated with the target user via the blender software; and
maintaining association at the multimedia server with a signaling path associated with the voice component and the multimedia component such that multimedia services may be provided during the course of the voice component.

18. The method of claim 17 wherein said telephony server directs the voice component to the target user based on the indication of origin.

19. The method of claim 17 further comprising using the blender software associated with the multimedia server to create the voice component in parallel with the multimedia component.

20. The method of claim 17 wherein receiving, at the multimedia server, the multimedia component for the target user comprises receiving the multimedia component for the target user selected from a group consisting of: incoming and outgoing.

21. A computer readable medium embodied with blender software adapted to:
receive a session request for a target user;
send an invite to the target user;
separate the session request into a voice component and a multimedia component; and
contact the target user for establishment of the voice component and the multimedia component;
wherein the blender software contacts the target user for establishment of the voice component though a telephony server and a multimedia server and the blender software sends the multimedia component to a computing device associated with the target user.

22. The computer readable medium of claim 21 wherein said blender software is further adapted to function on the multimedia server.

23. The computer readable medium of claim 21 wherein said blender software is further adapted to receive the session request for the target user from the telephony server.

24. The computer readable medium of claim 21 wherein said blender software is further adapted to receive the session request for the target user from the multimedia server.

25. The computer readable medium of claim 21 wherein said blender software is further adapted to respond to SIP commands.

* * * * *

UNITED STATES PATENT AND TRADEMARK OFFICE
CERTIFICATE OF CORRECTION

PATENT NO. : 7,646,761 B2  Page 1 of 1
APPLICATION NO. : 10/262022
DATED : January 12, 2010
INVENTOR(S) : Taylor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2101 days.

Signed and Sealed this

Twenty-eighth Day of December, 2010

David J. Kappos
*Director of the United States Patent and Trademark Office*